N. M. BROWN.
FRICTION CLUTCH FOR ENSILAGE MACHINES.
APPLICATION FILED FEB. 2, 1914.
1,128,942. Patented Feb. 16, 1915.
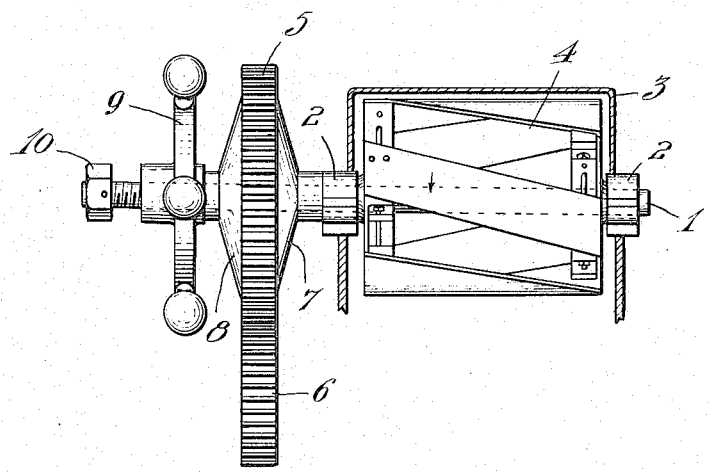
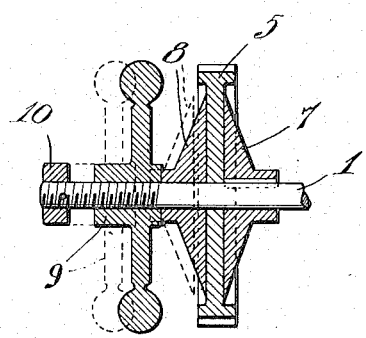
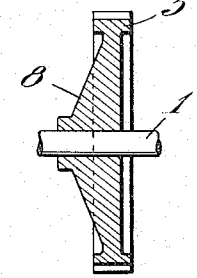
Witnesses:
Inventor,
Norton M. Brown,
by Joshua R. H. Potts
his Attorney.

UNITED STATES PATENT OFFICE.

NORTON M. BROWN, OF AURORA, ILLINOIS.

FRICTION-CLUTCH FOR ENSILAGE-MACHINES.

1,128,942.   Specification of Letters Patent.   Patented Feb. 16, 1915.

Application filed February 2, 1914. Serial No. 815,957.

*To all whom it may concern:*

Be it known that I, NORTON M. BROWN, a citizen of the United States, and a resident of the city of Aurora, county of Kane, and State of Illinois, have invented certain new and useful Improvements in Friction-Clutches for Ensilage-Machines, of which the following is a specification.

My invention relates to improvements in friction clutches designed for use especially in conjunction with ensilage machines, and has for its object the production of a friction clutch through the medium of which the cutter shaft of an ensilage machine may be so connected with the driving gear of the machine that in the event of the cutter head being suddenly stopped because of some obstruction in the machine or for any reason, the operative connection between said shaft and the driving gearing will be automatically broken.

A further object is the production of a friction clutch as mentioned which will be of durable and economical construction, and efficient in operation.

Other objects will appear hereinafter.

The invention consists in the combinations and arrangements of parts hereinafter described and claimed.

The invention will be best understood by reference to the accompanying drawing forming a part of this specification, and in which, Figure 1 is a sectional view of an ensilage machine showing the cutter thereof in conjunction with which is arranged a friction clutch embodying my invention, Fig. 2 is a sectional view through the clutch shown in Fig. 1, and Fig. 3 is a detail section illustrating a modified form of the gear shown in Figs. 1 and 2.

The preferred form of construction as illustrated in the drawing is applied to the cutter shaft 1 of an ensilage machine, which shaft, is shown mounted in bearings 2 provided in the casing or housing 3 of the machine. Arranged within the housing 3 and fixed to the shaft 1 is the cutter head 4. Loosely mounted upon shaft 1 is a gear 5 which meshes with the driving gear 6 of the machine, the latter, during operation of the machine being continually rotated.

Operative connection between the gear 5 and the shaft 1 is effected by means of friction disks 7 and 8 which are arranged upon said shaft at either side of said gear, the disk 7 being fixed to said shaft, whereas the disk 8 is loosely mounted thereon. The arrangement is such, as will be observed, that operative connection between the shaft 1 and gear 5 is established by pressing disks 7 and 8 into clamping engagement with the opposite sides of said gear, the operative connection between said gear and shaft, when this is done, being effected through frictional engagement of the opposite sides of said gear with said disks. Pressing of disks 7 and 8 into frictional engagement with the opposite sides of gear 5, as mentioned, is effected by means of a hand wheel 9 which is threaded upon said shaft at the outer side of disk 8. With this arrangement, it will be seen that operative connection between gear 5 and shaft 1 will be effected by simply tightening the hand wheel 9 into engagement with disk 8, it being clear that, when this is done, said disk will be pressed into engagement with the adjacent side of said gear, the latter in turn being pressed into frictional engagement with the disk 7. The threads upon shaft 1 are so arranged that in the operation of the machine should the cutter head 4 for any reason be stopped, as by reason of a piece of metal accidentally being fed into the machine, the sudden stopping of the cutter head will result in the release of the hand wheel 9, the latter at this stopping of the cutter head, continuing to rotate by reason of the momentum or inertia thereof, such rotation of said hand wheel, after the stopping of the cutter head and hence shaft 1, causing the same to be moved from the disk 8, and thereby obviously resulting in the breaking of the frictional engagement of disks 7 and 8 with the gear 5. When the connection is thus broken the gear 5 will simply run idle upon shaft 1. In order to insure the continued rotation of the hand wheel through its own momentum or inertia after the sudden stopping of the cutter head, as above mentioned, the peripheral portion of said wheel is especially weighted as clearly shown in Fig. 2.

Provided at the outer end of the shaft 1 is a stop 10 which limits the unscrewing movement of the hand wheel 9, as will be readily understood. If desired the gear 5 and disk 8 may be formed integral, as shown in Fig. 3, but with the first described form the frictional engagement between the shaft and the gear is greater and therefore perhaps better adapted where the machine is used for heavy work.

The clutch as described is in the nature of a safety device being adapted to effect automatically the disconnection of the cutter head from the driving mechanism of the machine in case of emergency. Through this provision the life of the blades of the cutter head will be extended since with this arrangement, in the event of a piece of metal or other foreign matter finding its way into the machine, the cutter head will be instantly stopped when one of the blades thereof contacts with the obstruction.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a shaft and a rotatable element loosely mounted upon said shaft, of means for operatively connecting said rotatable element with said shaft; and means operable by inertia for disconnecting said rotatable element from said shaft, substantially as described.

2. The combination with a shaft and a gear loosely mounted upon said shaft, of means for operatively connecting said gear with said shaft, said means comprising a friction element engaging against said gear; and means for holding said friction element and gear in operative relation, said last mentioned means being movable by inertia to inoperative position relative to said gear and friction element, substantially as described.

3. The combination with a shaft and a gear loosely mounted upon said shaft, of means for operatively connecting said gear with said shaft, said means comprising a friction element engaging against said gear; and means for holding said friction element and gear in operative relation, said last mentioned means being so connected with said shaft that, upon sudden cessation of rotation of said shaft, said means will be moved by inertia to inoperative position relative to said gear and friction element, substantially as described.

4. The combination with a shaft and a gear loosely mounted upon said shaft, of means for operatively connecting said gear with said shaft, said means comprising a friction element engaging against said gear; and means for holding said friction element and gear in operative relation, said last mentioned means being threaded upon said shaft, the threads being so disposed relative to said friction element and the direction of rotation of said shaft that, upon sudden cessation of rotation of said shaft, said means will be moved by inertia to inoperative position relative to said gear and friction element, substantially as described.

5. The combination with a shaft and a gear loosely mounted upon said shaft, of means for operatively connecting said gear with said shaft, said means comprising a friction member fixed to said shaft adapted to engage against one side of said gear; an element having a weighted peripheral portion threaded upon said shaft and arranged at the opposite side of said gear for pressing the latter into engagement with said friction element, the threads on said shaft and weighted element being so disposed relative to said gear and the direction of rotation of said shaft that, upon sudden cessation of rotation of said shaft, said weighted element will be moved by inertia to inoperative position relative to said gear and friction element, substantially as described.

6. The combination with a shaft and a rotatable element loosely mounted upon said shaft, of means for operatively connecting said rotatable element with said shaft; and means threaded upon said shaft and operable by inertia for disconnecting said rotatable element from said shaft, substantially as described.

7. The combination with a shaft and a rotatable element loosely mounted upon said shaft, of means for operatively connecting said rotatable element with said shaft, said means comprising a friction element splined to said shaft and adapted for engagement with said rotatable element; and a member threaded upon said shaft for holding said friction element and said rotatable element in engagement, the threads on said shaft and said member being so disposed relative to said rotatable element and the direction of rotation of said shaft that, upon sudden cessation of rotation of said shaft, said member will be moved by inertia to inoperative position relative to said rotatable element and said friction element, substantially as described.

8. The combination with a shaft and a rotatable element loosely mounted upon said shaft, of means for operatively connecting said rotatable element with said shaft; means threaded upon said shaft and operable by inertia for disconnecting said rotatable element from said shaft; and a stop on said shaft spaced from said means, when the latter is in operative position, to limit outward movement of said means on said shaft, substantially as described.

9. The combination with a shaft and a rotatable element loosely mounted upon said shaft, of means for operatively connecting said rotatable element with said shaft, said means comprising a friction element splined to said shaft and adapted for engagement with said rotatable element; a member threaded upon said shaft for holding said friction element and said rotatable element in engagement, the threads on said shaft and said member being so disposed relative to said rotatable element and the direction of rotation of said shaft that, upon sudden cessation of rotation of said shaft, said member will be moved by inertia to inoperative position relative to said rotatable element and said friction element; and a stop on said shaft spaced from said member, when the latter is in operative position, to limit the outward movement of said member on said shaft, substantially as described.

In testimony whereof I have signed my name to this specification in the presence of two subscribing witnesses.

NORTON M. BROWN.

Witnesses:
JOSHUA R. H. POTTS,
HELEN F. LILLIS.